US010346352B2

(12) United States Patent
Perez et al.

(10) Patent No.: US 10,346,352 B2
(45) Date of Patent: Jul. 9, 2019

(54) PROVIDING NOTIFICATION BASED ON DESTINATION OF FILE OPERATION

(71) Applicant: MICROSOFT TECHNOLOGY LICENSING, LLC, Redmond, WA (US)

(72) Inventors: Carlos Perez, Seattle, WA (US); John Lincoln DeMaris, Seattle, WA (US); Melissa Torres, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 15/173,732

(22) Filed: Jun. 6, 2016

(65) Prior Publication Data
US 2017/0351690 A1 Dec. 7, 2017

(51) Int. Cl.
*G06F 16/11* (2019.01)
*G06F 16/13* (2019.01)
(Continued)

(52) U.S. Cl.
CPC ............ *G06F 16/119* (2019.01); *G06F 16/13* (2019.01); *G06F 16/16* (2019.01); *G06Q 10/10* (2013.01); *G06Q 10/101* (2013.01)

(58) Field of Classification Search
CPC ......... G06F 17/30079; G06F 17/30091; G06F 17/30115; G06F 16/10; G06F 16/101;
(Continued)

(56) References Cited

U.S. PATENT DOCUMENTS 6,549,916 B1 * 4/2003 Sedlar ............... G06F 17/30067
8,458,283 B1 * 6/2013 Chapweske ........ H04N 1/00204
709/213

(Continued)

FOREIGN PATENT DOCUMENTS

WO 2005103867 A1 11/2005
WO 2015015504 A1 2/2015

OTHER PUBLICATIONS

Rosenstein, Mark A., et al., "The Athena Service Management System", USENIX Winter Conference, Dallas, TX, Jan. 1988, USENIX Association, 11 pages.*
"How to Share Folders and Files", Retrieved From <<https://web.archive.org/web/20150912172936/https://www.zoho.com/docs/help/secure-sharing.html>>, Sep. 12, 2015, 11 Pages.
(Continued)

*Primary Examiner* — Robert Stevens
(74) *Attorney, Agent, or Firm* — Michael Best & Friedrich LLP (57) ABSTRACT

A notification based on a destination of a file operation is provided. A file management service initiates operations to provide the move notification upon detecting the move operation to move the file from a source location to a destination location. A stakeholder is identified with an access to the destination location prior to executing the move operation to move the file from the source location to the destination location. After executing the move operation, a move notification is generated to inform the stakeholder of the move operation. The move notification provides information such as a description of the file, the source location, the destination location, and/or an identification of an initiator of the move operation. Furthermore, the move notification is transmitted to the stakeholder.

19 Claims, 7 Drawing Sheets

(51) Int. Cl.
*G06Q 10/10* (2012.01)
*G06F 16/16* (2019.01)

(58) Field of Classification Search
CPC ........ G06F 16/13; G06F 16/119; G06F 16/16; G06Q 10/101; G06Q 10/10
USPC .......................................................... 707/783
See application file for complete search history.

(56) References Cited

U.S. PATENT DOCUMENTS

| | | | |
|---|---|---|---|
| 8,484,292 B2 * | 7/2013 | Spataro ................. | H04L 65/403 709/205 |
| 9,104,682 B2 | 8/2015 | Banerjee et al. | |
| 9,690,785 B1 * | 6/2017 | Vagell ............... | G06F 17/30011 |
| 2005/0091595 A1 * | 4/2005 | Shappell ................. | H04L 29/06 715/700 |
| 2006/0294039 A1 | 12/2006 | Mekenkamp et al. | |
| 2011/0252093 A1 * | 10/2011 | Spataro ................. | G06Q 10/10 709/204 |
| 2013/0339420 A1 * | 12/2013 | Srinivasan ........ | G06F 17/30168 709/203 |
| 2014/0059217 A1 | 2/2014 | Pizurica | |
| 2014/0258970 A1 * | 9/2014 | Brown ..................... | G06F 8/47 717/103 |
| 2015/0229648 A1 * | 8/2015 | Avery .................. | H04L 63/101 726/30 |
| 2015/0261974 A1 | 9/2015 | Kirigin et al. | |
| 2015/0370769 A1 * | 12/2015 | Pereira Filho .......... | G06F 17/21 726/28 |
| 2017/0250816 A1 * | 8/2017 | Popa ..................... | H04L 9/3247 |

OTHER PUBLICATIONS

"Solved: Folder Collaborator's email Notifications.—Box", Retrieved from <<https://webcache.googleusercontent.com/search?q=cache:QMK63SzE7zoJ:https://community.box.com/t5/Box-Troubleshooting-Forum/Folder-Collaborator-s-email-notifications/td-p/6081+&cd=1&hl=en&ct=clnk&gl=in>>, Oct. 26, 2015, 3 Pages.

"International Search Report and Written Opinion Issued in PCT Application No. PCT/US2017/034104", dated Jul. 14, 2017, 13 Pages.

"Can't open a file", Published on: Sep. 20, 2015, Available at: https://support.google.com/docs/answer/6211862?hl=en, 2 pages.

Mir, et al., "Simple Watcher Monitors Local & Network Folders; Runs Apps or Sends Emails When Changes Occur", Published on: Feb. 13, 2013, Available at: http://www.addictivetips.com/windows-tips/monitor-folders-auto-run-apps-or-send-emails-when-changes-occur/, 6 pages.

Agarwal, Amit, "Get Daily Email Reports of your Google Drive Activity", Published on: Nov. 14, 2014, Available at: http://www.labnol.org/internet/google-drive-activity-report/13857/, 3 pages.

"Moving content from shared folders", Published on: Apr. 28, 2014, Available at: https://support.google.com/a/answer/2789107?hl=en, 3 pages.

"Tracking file and folder changes", Retrieved on: Apr. 22, 2016, Available at: https://www.ibm.com/developerworks/community/help/index.jsp?topic=%2Fcom.ibm.lotus.connections.files.help%2Ft_files_track_changes.html, 1 page.

"Get Email Notifications of Site Changes", Published on: Aug. 14, 2011, Available at: http://legacy-documentation.concrete5.org/tutorials/get-email-notifications-of-site-changes, 2 pages.

"Share Files and Folders", Published on: Apr. 19, 2014, Available at: https://www.zoho.com/docs/help/file-sharing.html, 2 pages.

\* cited by examiner

PROVIDING NOTIFICATION BASED ON DESTINATION OF FILE OPERATION

BACKGROUND

When working with files stored in file management solutions (like cloud drives), a file owner may share one of his or her files with a collaborator to allow them to open that file. The collaborator may share the file with the file owner while collaborating in a common task and/or project. For some files that are shared, the file owner may trust the collaborator he or she shares with to share content only with people who need access to that information. Therefore, to allow for friction-free collaboration within a working group, the file owner may allow other recipients access to the file through a shared link. The document may be accessed through the shared link without having to approve every new person accessing the file, or having to specify in advance individuals who should be granted access.

However, during the lifecycle of the file, the file owner may conclude the collaboration project with the collaborators, the collaboration project may change owner(s), and/or the collaboration project may move a new phase other than a conclusion. The file owner may wish to relocate the file to a shared location to share the file with another set of participants. The original collaborators may or may not be part of the new participants. As such, it may be crucial to inform the old collaborators and the new participants to file operations performed on the file during the lifecycle of the file, which may remove or grant access to the file.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a notification based on a destination of a file operation. A file management service, according to embodiments, may initiate operations to provide a move notification upon detecting a move operation to move a file from a source location to a destination location. Next, a stakeholder who has an access to the destination location is detected. The move operation may be executed to move the file from the source location to the destination location. A move ratification may be generated to inform the stakeholder of the move operation. Furthermore, the move notification may be transmitted to the stakeholder.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a notification may be provided by a file management service based on a destination of a file operation. In an example scenario, the file management service may detect a move operation to move a file from a source location to a destination location. The source location may include a collaboration space (such as a folder and/or a repository) shared by collaborator(s) to work together on the file. The destination location may include a shared repository (or a folder) that may provide the file to a group of stakeholders.

Next, a stakeholder may be identified who has an access permission to the destination location. The stakeholder may include a collaborator, a team member, a member of a group, among other entities interested in the file or the destination location. The move operation may also be executed to move the file from the source location to the destination location. In response, a move notification may be generated to inform the stakeholder of the move operation. The move notification may include a description of the file, the source location, the destination location, and an identity of an initiator of the move operation. The initiator may include a file owner and/or a collaborator who has access permission to the source location. Furthermore, the move notification may also be transmitted to the stakeholder.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a notification based on a destination of a file operation. Examples of platforms include, but are not limited to, a hosted service executed over a plurality of servers, an application executed on a single computing device, and comparable systems. The term "server" generally, refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash, drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interlace (API) may be a set of routines, protocols, and tools for an application or service that enable the application or service to interact or communicate with one or more other applications and services managed by separate entities.

Figure 1:
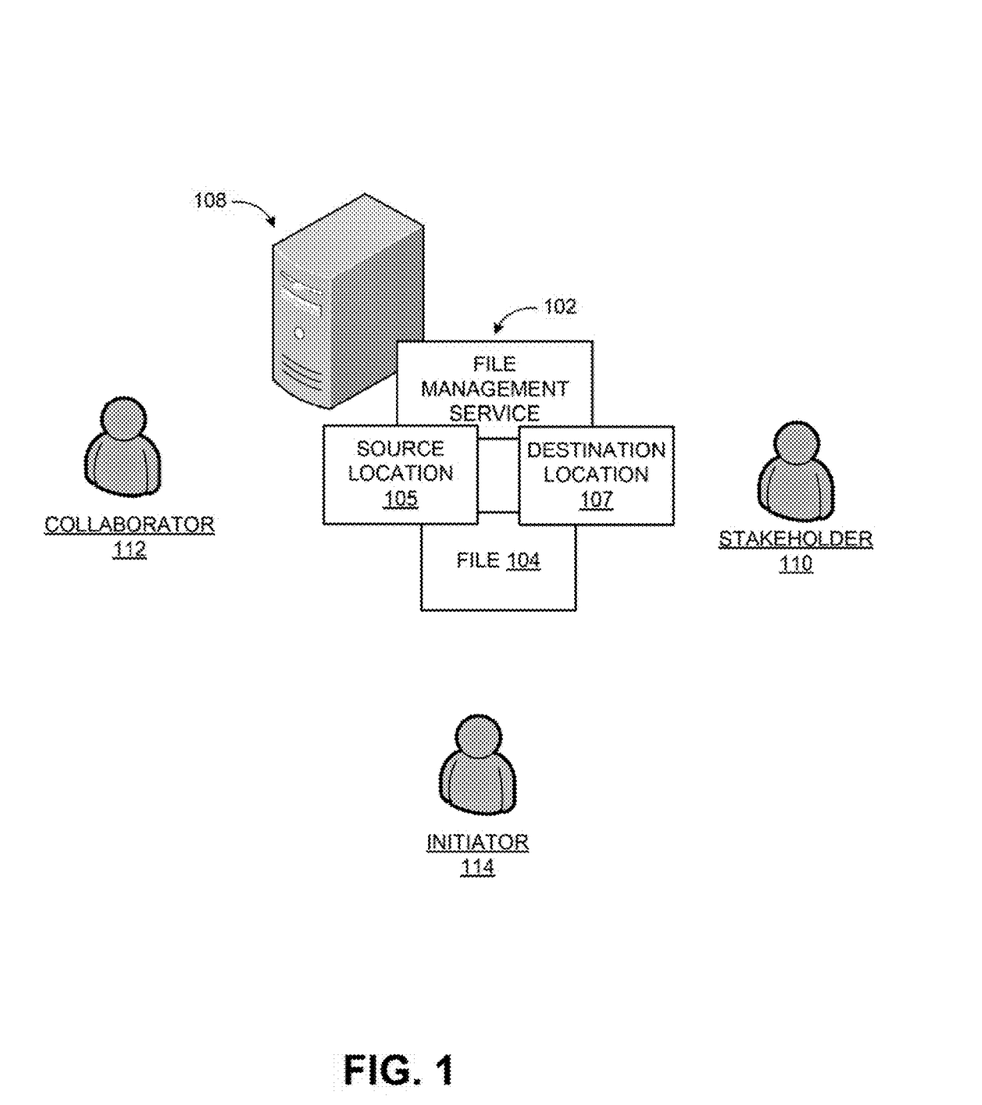
FIG. 1 is a conceptual diagram illustrating an example of providing a notification based on a destination of a file operation, according to embodiments.

FIG. 1 is a conceptual diagram illustrating examples of providing a notification based on a destination of a file operation, according to embodiments.

In a diagram 100, a computing device 108 may execute a file management service 102. The computing device 108 may include a desktop computer, a mobile computer, and/or a physical server that provide service(s) and/or application(s). A service may include an application performing operations in relation to a client application and/or a subscriber, among others.

The computing device 108 may execute the file management service 102. The file management service 102 may initiate operations to facilitate file operation(s) such a move operation, a deletion operation, and/or an authorization operation, among others. The file management service 102 may also provide notification(s) such as move notification, a deletion notification, among others to a collaborator with an access to a source location of the file 104 and/or a stakeholder with an access to a destination location of the file 104. The file management service 102 may provide the notification(s) to inform the collaborator and/or the stakeholder of the file operation(s) executed on the file 104 during a lifecycle of the file 104. In the example configuration of FIG. 1, the collaborator 112 may include a person who has an access permission to the file at a source location 105 and collaborates on the file 104 at the source location. The collaborator 112 may or may not have an access permission to the file at a destination location 107. The stakeholder 110 may include a person who has an access permission to the file 104 at the destination location 107. The stakeholder 110 may include the collaborator 112, among others. The initiator 114 may include a file owner and/or the collaborator 112 who is authorized to execute the move operation to move the file 104 from the source location 105 to the destination location 107.

In an example scenario, the file management service 102 may detect a move operation to move the file 104 from a source location 105 to the destination location 107. The collaborator 112 may be identified as having an access permission to the file 104 at the source location 105. The stakeholder 110 may be identified as having an access permission to the file at the destination location 107. An initiator 114 (who initiates the move operation) may be prompted to grant an access permission to the collaborator 112 to allow the collaborator to access the file 104 at the destination location. Next, the move operation may be executed to move the file 104 from the source location 105 to the destination location 107. A move notification may be generated to inform the stakeholder 110 and/or the collaborator 112 of the move operation. The move notification may also be generated prior to executing the move operation. Furthermore, the move notification may be transmitted to the stakeholder 110 and/or the collaborator 112.

The computing device 108 may communicate with other device(s) that may host the source location 105 and/or the destination location 107 (such as file server(s) and/or cloud server(s), among others) through a network. The network may provide wired or wireless communications between nodes such as the other device(s), or the computing device 108, among others. Previous example(s) to provide a notification based on a destination of a file operation are not provided in a limiting sense. Alternatively, the file management service 102 may manage the file 104 at a desktop application, a workstation application, and/or a server application, among others. The file management service 102 may also provide a client interface for rendering.

The initiator 114, the stakeholder 110, and/or the collaborator 112 may interact with a client interlace of the file management, service 102 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 108, the file management service 102, embodiments are not limited to these components or system configurations and can be implemented with other system configuration employing fewer or additional components.

Figure 2:
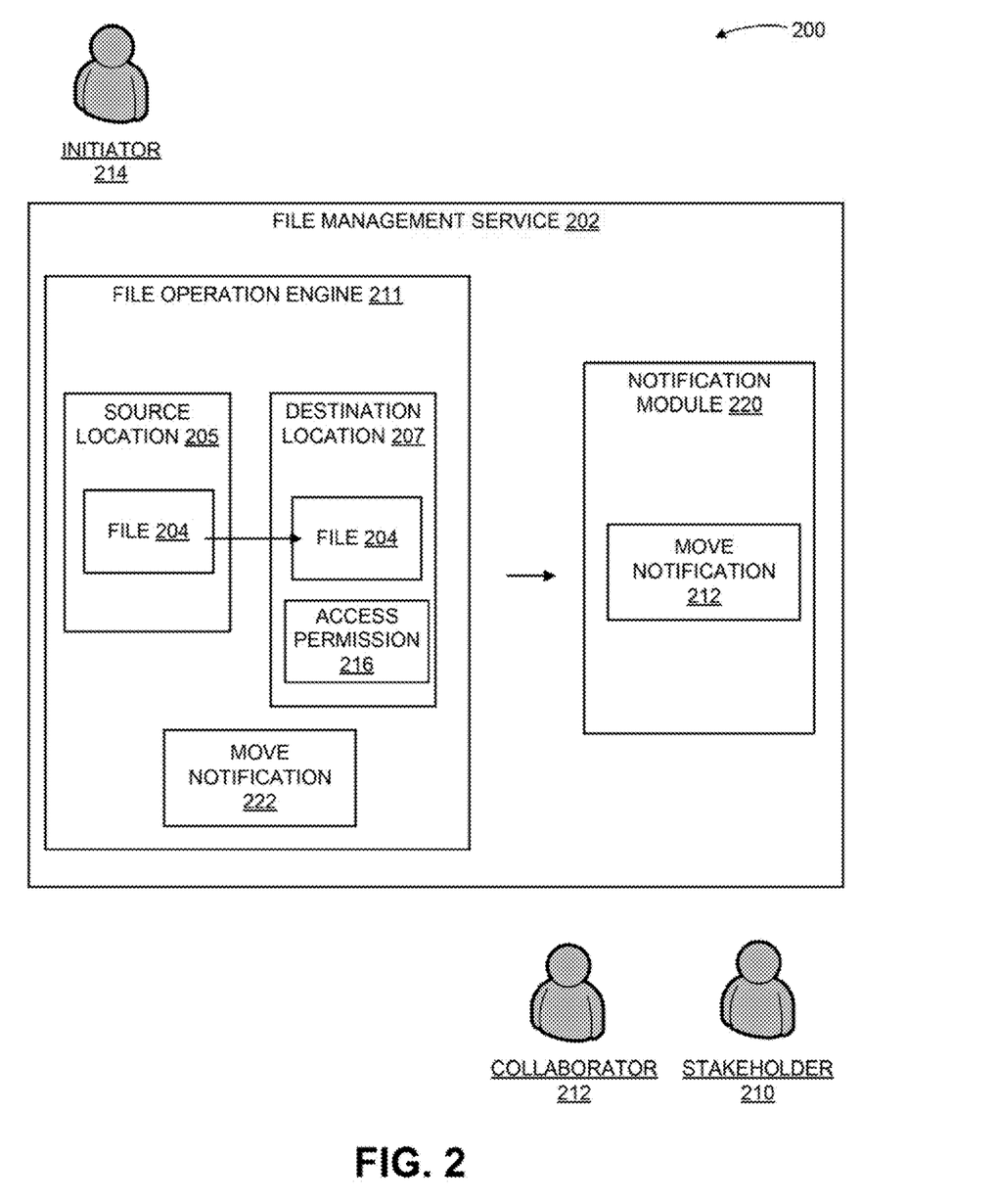
FIG. 2 is a display diagram illustrating example components of a file management service that provides a notification based on a destination of a file operation, according to embodiments.

FIG. 2 is a display diagram illustrating example components of a file management service that provides a notification based on a destination of a file operation, according to embodiments.

In a diagram 200, a file operation engine 211 of a file management service 202 may detect a move operation to move a file 204 from a source location 205 to a destination location 207. The move operation may be initiated by an initiator 214 such as a file owner. At the source location 205, the file may be shared in a collaboration, with a collaborator 212. Next, the file operation engine 211 may identify a stakeholder 210 with an access permission 216 to the destination location 207. The destination location 207 may include a shared repository that provides services to share resources such as the file 204.

The file operation engine 211 may execute the move operation and move the file from the source location 205 to the destination location 207. A move notification 222 may be generated to inform the stakeholder 210 of the move operation. The move notification 222 may include a description of the source location 205, the destination location 207, and the initiator 214 of the move operation. Moreover, a notification module 220 of the file management service 202 may transmit the move notification to the stakeholder 210.

The initiator 214 may continue to wish to provide the collaborator 212 access the file 204 at the destination location 207. However, the collaborator 212 may lack an access permission to the destination location 207. In such a scenario, the file operation engine 211 may query the initiator 214 wish an authorization notification to grant the collaborator 212 an access to the file at the destination location 207. Alternatively, the collaborator 212 may be automatically granted an access to the destination location 207. In yet another scenario, the collaborator 212 may have the access permission to the destination folder 207 as a member of a group and/or individually. As such, the notification module 220 may also transmit the move notification 222 to the collaborator 212 to inform the collaborator 212 of the move operation to place the file 204 within the destination location 207.

Figure 3:
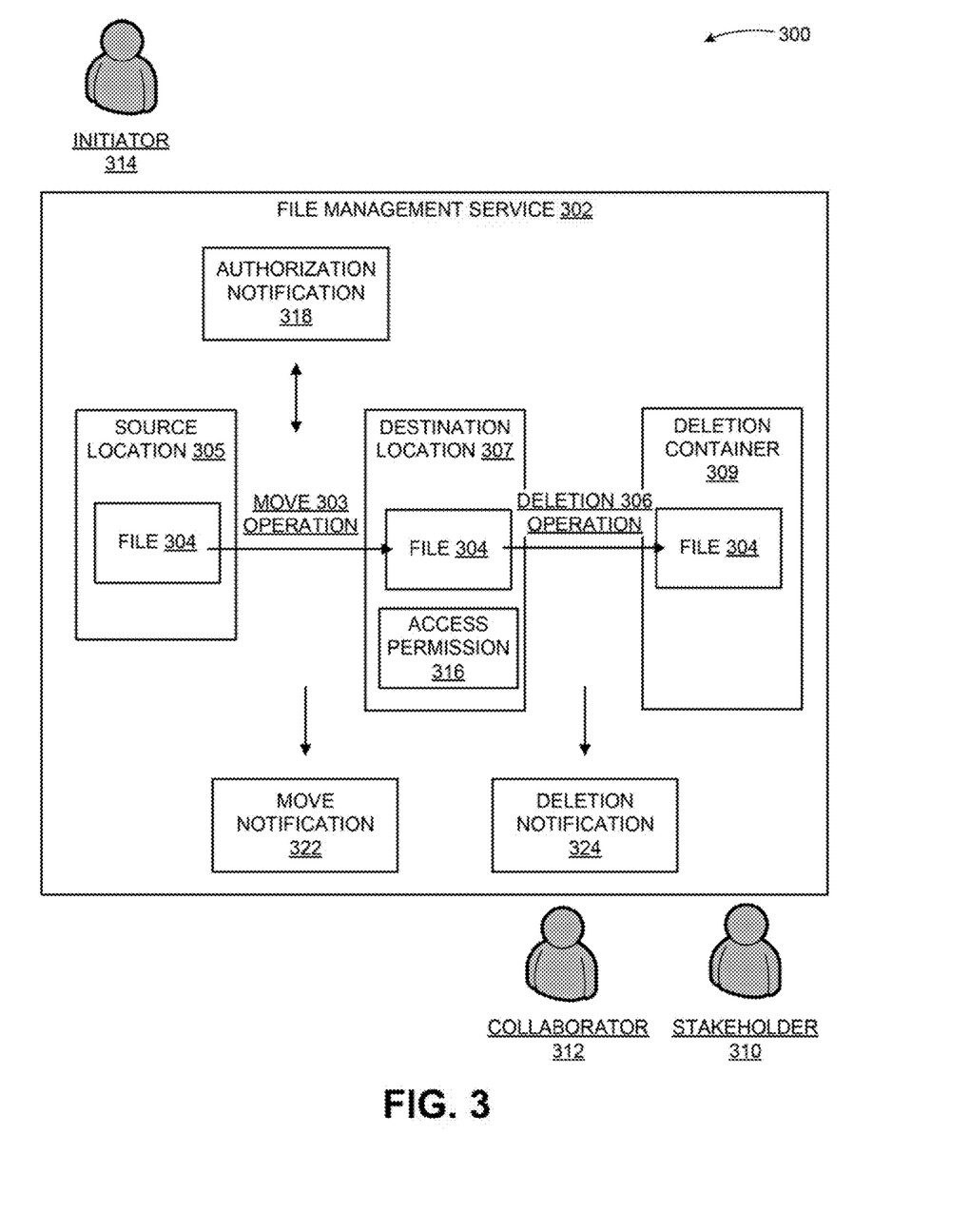
FIG. 3 is a display diagram illustrating a scheme to provide a notification based on a destination of a file operation, according to embodiments.

FIG. 3 is a display diagram illustrating a scheme to provide a notification based on a destination of a file operation, according to embodiments.

In a diagram 300, a file management service 302 may execute a move operation 303 to move a file 304 from a source location 305 to a destination location 307. An initiator 314 (such as a file owner) may be detected as having initiated the move operation 303. In response to the move operation 303, the file management service 302 may automatically transmit a move notification 322 to a collaborator 312 who has an access to the file at the source location 305 to inform the collaborator 312 about the move operation 303. Furthermore, a stakeholder 310 may also be informed with the move notification 322 about the move operation 303. The stakeholder 310 may be informed to establish the file 304 as a shared resource at the destination location 307.

The collaborator 312 may be detected as lacking an access permission to the destination location 307. As such, the collaborator 312 may be prevented from accessing the file 304 at the destination location 307. The initiator 314 of the move operation 303 may wish to provide the collaborator 312 an access to the file at the destination location 307. To fulfill such demand(s), the file management service 302 may generate an authorization notification 318 to have the initiator 314 (or a file owner) to grant the collaborator the access permission 316 to the destination location 307. The authorization notification 318 may be transmitted to the initiator 314 (or a file owner) who has a modification permission to the file 304. In response, an authorization reply may be received from the initiator 314 (or the file owner).

Next, the collaborator 312 may be granted the access permission to the destination location 307. Alternatively, the collaborator 312 may be granted the access permission 316 to the destination location 307 automatically. The collaborator 312 may be automatically granted the access permission 316 in response to further analysis of a collaboration project that may indicate a continued timeline of collaboration between the initiator 314, the stakeholder 310, the file 304 and the collaborator 312. Other resources may be used, queried, and/or analyzed to automate granting of the access permission 316 to the collaborator 312 to access the destination location 307.

In an example scenario, a source link to the file 304 provided to the collaborator 312 may be identified. The source link may refer to the file 304 at the source location 305. After the move operation 303, the source link may be broken because the file 304 may no longer be found at the source location 305. The collaborator 312 may be provided with a continued access to the file 304 with a destination link. The file management service 302 may generate the destination link. The destination link may refer to the file 304 at the destination location 307. The destination link may be provided within the move notification 322 to the collaborator.

In another example scenario, the file management service 302 may detect a deletion operation to move the file 304 to a deletion container 309. The deletion operation 306 may be executed by the initiator 314, the stakeholder 310 and/or the collaborator 312 who has a deletion permission to delete the file 304. Next, the deletion operation may be executed and the file 304 may be moved to the deletion container 309. The deletion container 309 may store the file indefinitely or a during a time period that may be adjustable by an entity with an authorization to modify a configuration of the deletion container. The entity may include the initiator 314, the stakeholder 310, and/or the collaborator 312, among others.

The file management service 302 may generate a deletion notification to inform the stakeholder 310 and/or the collaborator 312 of the deletion operation 306 initiated by the initiator 314. The deletion notification 324 may include a description of the file, the destination location, the deletion container, and an identification of the initiator 314 of the deletion operation 306. The initiator 314 may include the stakeholder 310, the collaborator 312, and/or a file owner, among others.

If the stakeholder 310 and/or the collaborator 312 are detected as the initiator 314 of the deletion operation, an authorization notification may be generated to have a file owner authorize the deletion operation 306. The authorization notification may be transmitted to the file owner. In response to the authorization notification, an authorization reply may be received. The authorization reply may authorize the deletion operation. As such, the file management service may proceed with the deletion operation 306 to remove the file from the destination location 307 and place the file 304 into the deletion container 309.

The deletion notification 324 may also include element(s) with operations to restore the file 304 to the destination location 307 or a location of choice by the stakeholder 310 and/or the collaborator 312 (also known as the restorer). In response to an activation of the element(s), operations to restore the file 304 to a location of choice (by the restorer) may be executed.

In another example scenario, the move notification 322 may be resent to the stakeholder 310 and/or the collaborator 312 in response to a failure to detect an access operation executed on the file in the destination location 307 within a time period. The time period may be adjustable by a configuration setting accessible by the initiator 314 of the move operation 303. Similarly, the deletion notification 324 may also be resent to the collaborator 312 and/or the stakeholder 310 in response to failure to detect a restore operation to restore the file 304 from the deletion container 309 within another time period. The other time period may also be adjustable by a configuration setting accessible by the initiator 314 of the deletion operation 306.

In an alternative example scenario, the move notification 322 may be transmitted to the collaborator after identifying the collaborator as a member of a group associated with the stakeholder. The group may be identified as having the access permission 316 to the destination location 307.

In another example scenario, the file management service 302 may execute additional operations prior to transmitting the move notification 322 to the collaborator 312. For example, the file management service 302 may create a list of access candidate(s). The list may include the collaborator 312. The list may be transmitted to a file owner (or the initiator 314) to prompt the file owner to provide the access permission 316 to the file 304 at the destination location 307 to a selection from the list. Next, the selection from the list may be received from the file owner. The selection may have been granted the access permission to the file at the destination location 307 by the file owner. In response, the file management service 302 may grant the access permission 316 to the selection from the list.

Figure 4:
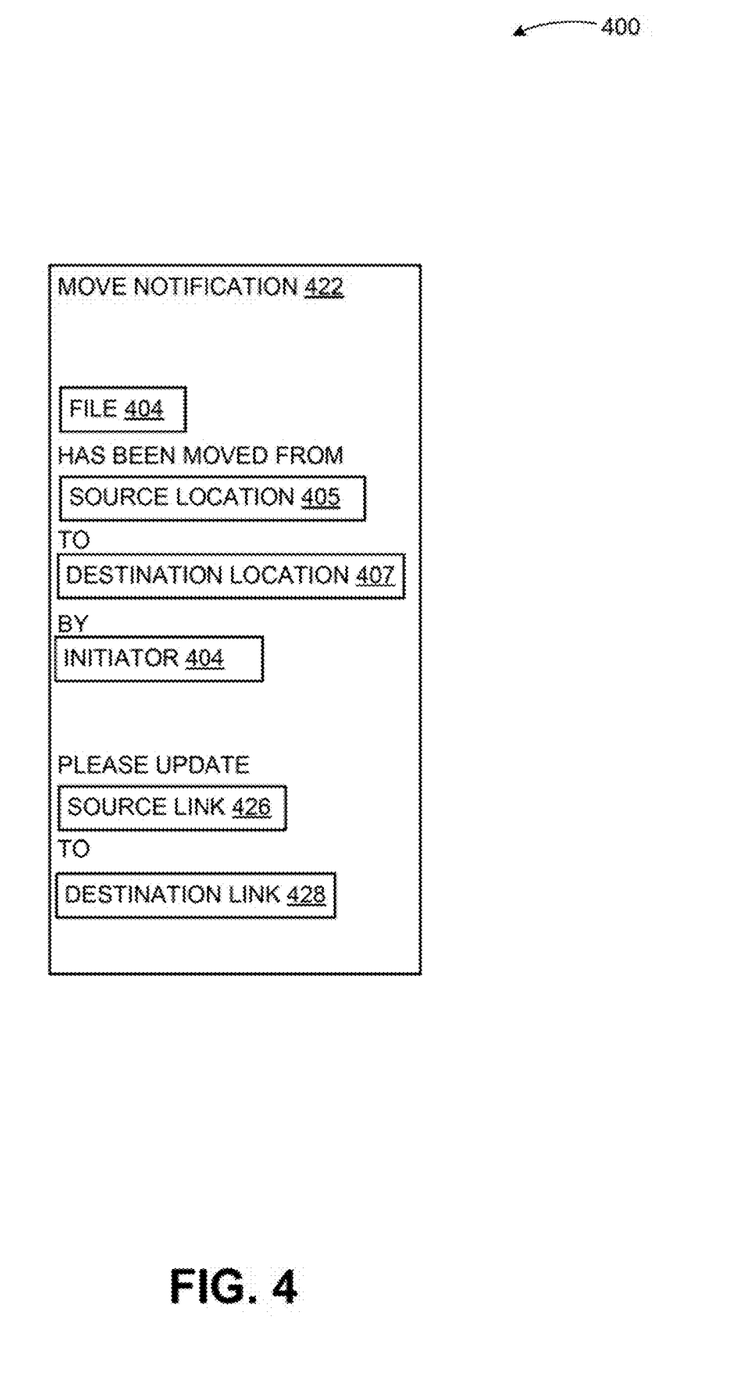
FIG. 4 is a display diagram illustrating an example of a move notification, according to embodiments.

FIG. 4 is a display diagram illustrating an example of a move notification, according to embodiments.

In a diagram 400, a file management service 402 may provide a move notification 422 to a client interface to be rendered for a stakeholder who has an access permission to a destination location 407. The move notification 422 may also be provided to a collaborator who has an access permission to the file 404 at the source location 405. The collaborator may have been provided with access permission to access the file 404 at the destination location. The collaborator have been provided with the access permission at the destination location upon an access request received from the collaborator. The access permission may be granted automatically upon verification of conditions associated with granting the access permission to the collaborator (such as continued demand to collaborate on the file 404, among others). An initiator of the move operation may also be prompted to grant the access permission.

The move notification may be transmitted within an email, a text based message, an audio message, a visual message, and/or a prompt within the client interface, among others accessed by the collaborator and/or the stakeholder. The move notification 422 may include a description of the file 404, the source location 405, the destination location 407, and/or an identification of the initiator 414, among others.

The move notification may also include a source link 425 that refers to the file 404 at the source location 405 (the source link 426 is void after the move operation). The move notification 422 may also include a destination link 428 that refers to the file 404 at the destination location 407.

As discussed above, the file management service may be employed to perform operations to provide a notification based on a destination of a file operation. An increased user efficiency with the file management service 102 may occur as a result of informing the stakeholder of a move operation to place a file at a destination location accessible by the stakeholder and informing a collaborator of the move operation moving the file from the source location of the collaboration to the destination location. Additionally, automatically granting access to the collaborator to access the file at the destination location, may reduce processor load, increase processing speed, conserve memory, and reduce network bandwidth usage.

Embodiments, as described herein, address a need that arises from a lack of efficiency to automate a transmission of a notification based on a destination of a file operation. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Providing a notification based on a destination of a file operation may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
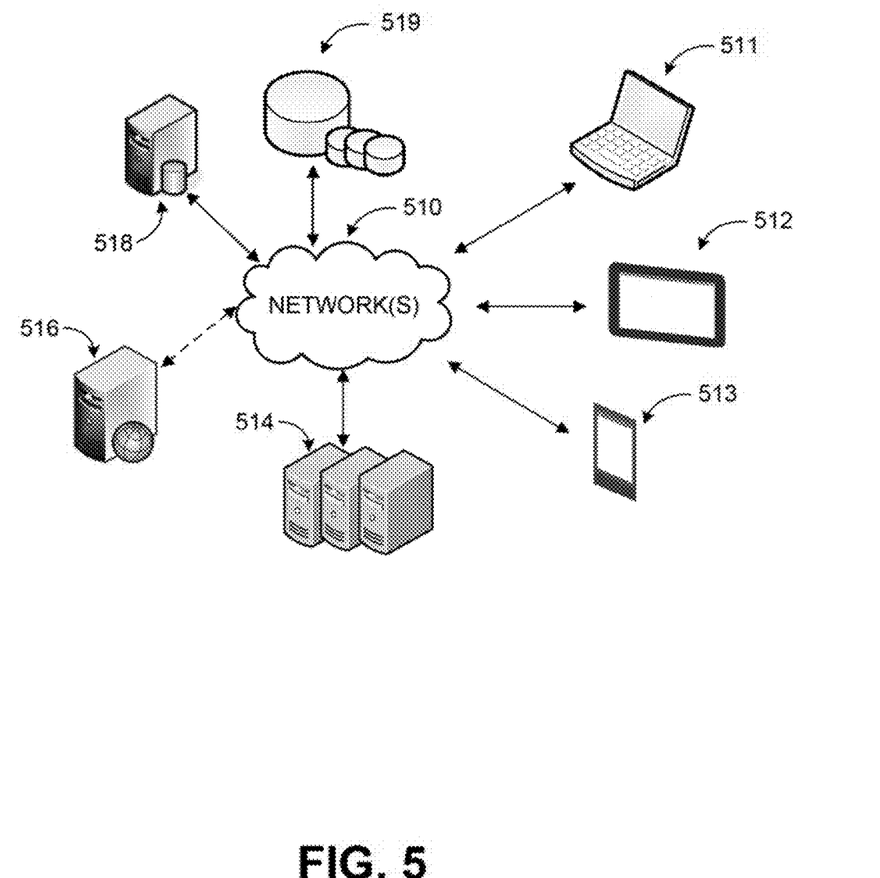
FIG. 5 is a simplified networked environment, where a system according to embodiments may be implemented.

FIG. 5 is an example networked environment, where embodiments may be implemented. A file management service configured to provide a notification based on a destination of a file operation may be implemented via software executed over one of more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A file management service may identify a stakeholder with an access permission to a destination location in response to detecting a move operation to move a file from a source location to the destination location. The move operation may be executed to move the file from the source location to the destination location. A move notification may be generated to inform the stakeholder of the move operation. Furthermore, the move operation may be transmitted to the stakeholder. The file management service may store data associated with the file, the source location, and/or the destination location in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a notification based on a destination of a file operation. Furthermore, the networked environments discussed in FIG. 5 are for illustration purposes only. Embodiments are not limited to the example applications, modules, or processes.

Figure 6:
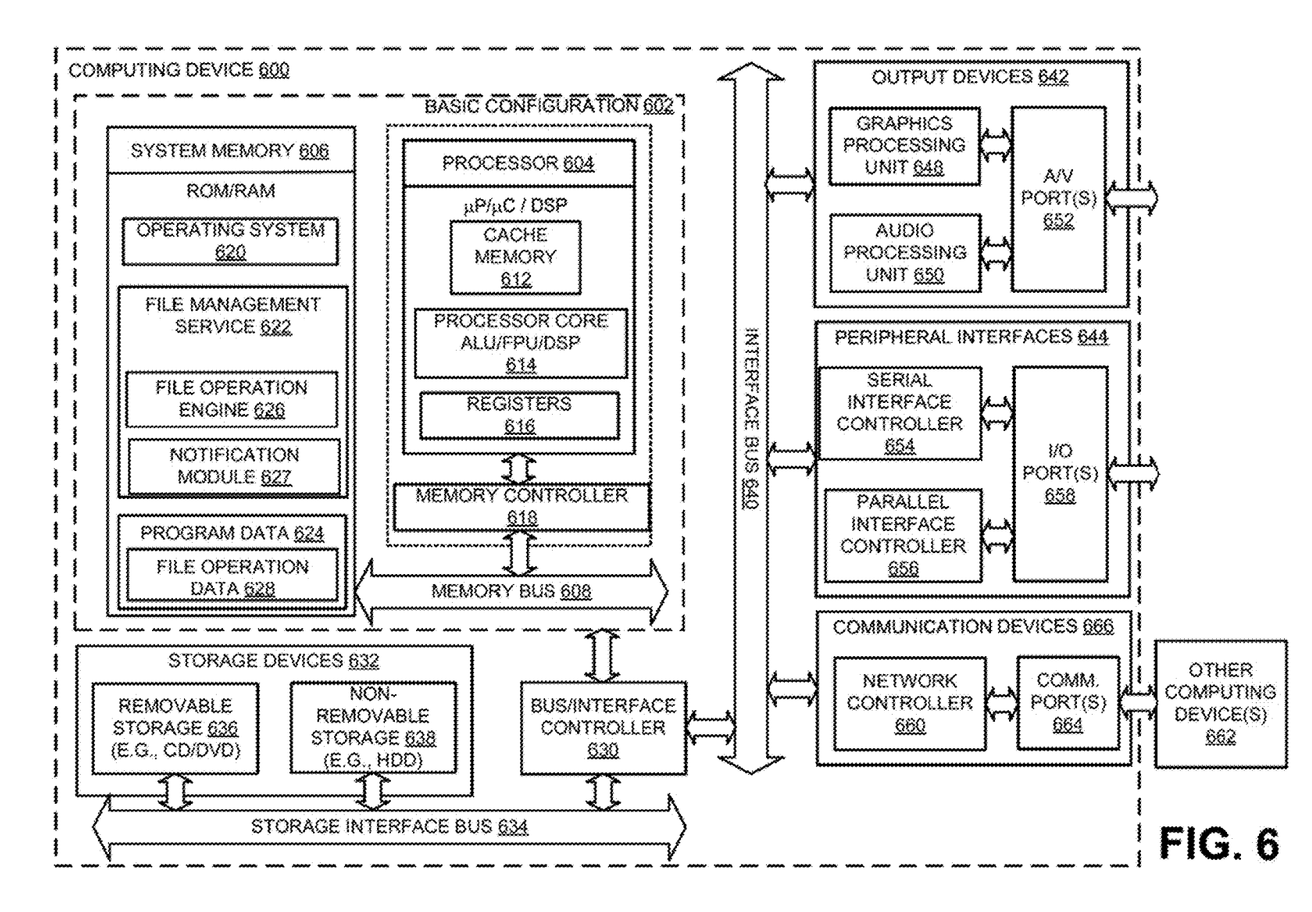
FIG. 6 is a block diagram of an example computing device, which may be used to provide a notification based on a destination of a file operation, according to embodiments.

FIG. 6 is a block diagram of an example computing device, which may be used to provide a notification based on a destination of a file operation, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a file management service 622, and a program data 624. The file management service 622 may include components such as a file operation engine 626 and a notification module 627. The file operation engine 626 and the notification module 627 may execute processes associated with the file management service 622. The file operation engine 626 may identify a stakeholder with an access permission to a destination location in response to detecting a move operation to move a file from a source location to the destination location. The move operation may be executed to move the file from the source location to the destination location. A move notification may be generated to inform the stakeholder of the move operation. The notification module 627 may transmit the move operation to the stakeholder.

Input to and output out of the file management service 622 may be transmitted through a communication device associated with the computing device 600. An example of the communication device may include a networking device that may be communicatively coupled to the computing device 600. The networking device may provide wired and/or wireless communication. The program data 624 may also include, among other data, file operation data 628, or the like, as described herein. The file operation data 628 may include a source location, and/or a destination location, among others.

The computing device 600 may have additional features or functionality, and additional interlaces to facilitate communications between the basic configuration 602 and any desired devices and interfaces. For example, a bus/interface controller 630 may be used to facilitate communications between the basic configuration 602 and one or more data storage devices 632 via a storage interface bits 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term, computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to provide a notification based on a destination of a file operation. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
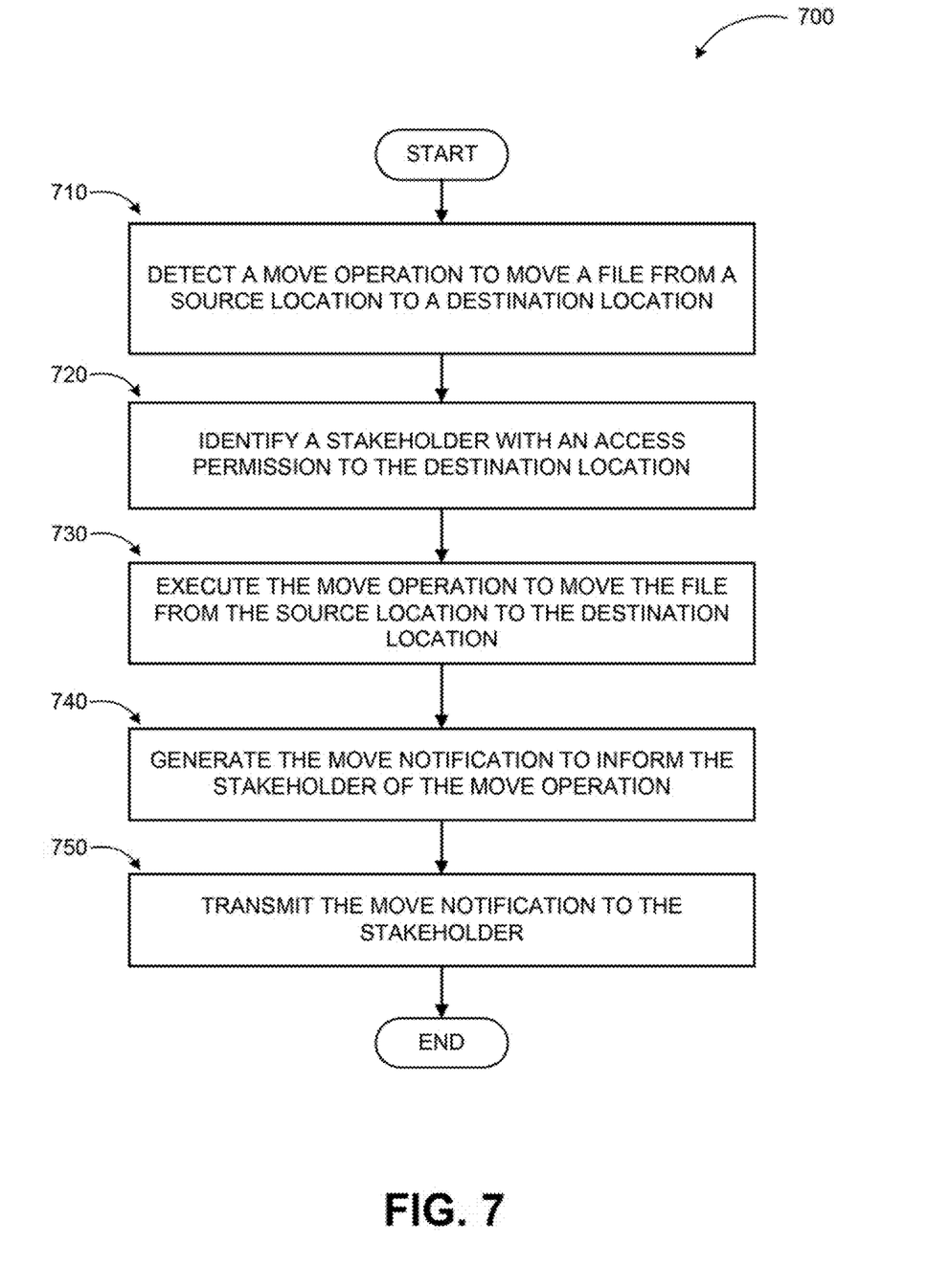
FIG. 7 is a logic flow diagram illustrating a process to provide a notification based on a destination of a file operation, according to embodiments.

FIG. 7 is a logic flow diagram illustrating a process to provide a notification based on a destination of a file operation, according to embodiments. Process 700 may be implemented on a computing device, such as the computing device 600 or another system.

Process 700 begins with operation 710, where the file management service detects the move operation to move a file from a source location to a destination location. The source location may include collaboration space where the file is shared with collaborator(s). The destination location may include a shared space where the file is shared with stakeholder(s). At operation 720, a stakeholder who has an access permission to the destitution location is identified. Next, at operation 730, the move operation is executed to move the file from the source location to the destination location. At operation 740, the move notification is generated to inform the stakeholder of the move operation. The move notification, may include a description of the file, the source location, the destination location, and/or an identification of an initiator of the move operation, among others. At operation 750, the move notification may be transmitted to the stakeholder.

The operations included in process 700 are for illustration purposes. Providing a notification based on a destination of a file operation may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

In some examples, a computing device to provide a notification based on a destination of a file operation. The computing de vice includes a communication device, a memory configured to store instructions associated with a file management service, processor(s) coupled to the memory and the communication device. The processor(s) execute the file management service in conjunction with the instructions stored in the memory. The file management service includes a file operation engine and a notification module. The file operation engine is configured to detect a move operation to move a file from a source location to a destination location, identify a stakeholder with an access permission to the destination location, execute the move operation to move the file from the source location to the destination location, and generate a move notification to inform the stakeholder of the move operation. The notification module is configured to transmit, through the communication device, the move notification to the stakeholder.

In other examples, the move notification includes a description of the file, the source location, the destination location, and an initiator of the move operation. The file operation engine is further configured to identify a collaborator of the file at the source location and prompt the notification module to transmit, through the communication device, the move notification to the collaborator to inform the collaborator of the move operation. The file operation engine is further configured to generate an authorization notification to have a file owner grant the collaborator the access permission to the destination location, where the file owner is an initiator of the move operation, transmit, through the communication device, the authorization notification to the file owner, receive an authorization reply to the authorization notification from the file owner, and prompt the file operation engine to grant the collaborator the access permission to the destination location.

In further examples, the file operation engine is further configured to automatically grant the collaborator the access permission to the destination location. The file operation engine is further configured to identity a source link to the file provided to the collaborator, where the source link refers to the file at the source location, generate a destination link to the file, where the destination link refers to the file at the destination location, and provide the destination link within the move notification to the collaborator. The file operation engine is further configured to detect a deletion operation to move the file to a deletion container, execute the deletion operation, and prompt the notification module to transmit, through the communication device, a deletion notification to the stakeholder to inform the stakeholder of the deletion operation. The deletion notification includes a description of the file, the destination location, the deletion container, and an initiator of the deletion operation. The file operation engine is further configured to detect the stakeholder initiate the deletion operation, generate an authorization notification to have a file owner authorize the deletion operation, transmit the authorization notification to the file owner, receive an authorization reply to the authorization notification, where the authorization reply authorizes the deletion operation, and prompt the file operation engine to execute the deletion operation.

In some examples, a method executed on a computing device to provide a notification based on a destination of a file operation. The method includes detecting a move operation to move a file from a source location to a destination location, identifying a stakeholder with an access permission to the destination location, identifying a collaborator of the file at the destination location, generating a move notification to inform the stakeholder and the collaborator of the move operation, executing the move operation to move the file from the source location to the destination location, and transmitting the move notification to the stakeholder and the collaborator.

In other examples, the method further includes in response to a failure to detect an access operation executed on the file in the destination location within a time period, retransmitting the move notification to the stakeholder and the collaborator. The method further includes identifying the collaborator as a member of a group associated with the stakeholder, where the group has the access permission to the destination location. The method further includes creating a list of one or more access candidates, where the list includes the collaborator, transmitting the list to a file owner to prompt the file owner to provide the access permission to the file at the destination location to a selection from the list, receiving the selection from the list whom the file owner has provided the access permission to the file at the destination location, where the selection includes the collaborator, and granting the access permission to the selection from the list. The move notification is transmitted within one or more of an email, a text based message, an audio message, a visual message, and a prompt within a client interface accessed by one or more of the collaborator and the stakeholder.

In some examples, a computer-readable memory device with instructions stored thereon to provide a notification based on a destination of a file operation is described. The instructions includes actions that are similar to the actions of the method.

In other examples, the instructions further include detecting a deletion operation to move the file to a deletion container, executing the deletion operation, and transmitting a deletion notification to the stakeholder and the collaborator to inform the stakeholder and the collaborator of the deletion operation, where the deletion notification includes a description of the destination location, the deletion container, and an initiator of the deletion operation. The instructions to automatically grant the collaborator the access permission to the destination location further include creating a list of one or more access candidates, where the list includes the collaborator, transmitting the list to a file owner to prompt the file owner to provide the access permission to the file at the destination location to a selection from the list, receiving the selection from the list whom the file owner has provided the access permission to the file at the destination location, where the selection includes the collaborator, and granting the access permission to the selection from the list.

In some examples, a means for providing a notification based on a destination of a file operation is described. The means for providing a ratification based on a destination of a file operation include a means for detecting a move operation to move a file from a source location to a destination location, a means for identifying a stakeholder with an access permission to the destination location, a means for executing the move operation to move the file from the source location to the destination location, a means for generating a move notification to inform the stakeholder of the move operation, and a means for transmitting the move notification to the stakeholder.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide a notification based on a destination of a file operation, the computing device comprising:
   a memory configured to store instructions associated with a file management service;
   one or more processors coupled to the memory, the one or more processors executing the file management service in conjunction with the instructions stored in the memory, wherein the one or more processors are configured to:
   detect a move operation by a user to move a file from a source location to a destination location, wherein a group of users have access permission to files at the source location;
   identify a member of the group of users without an access permission to the destination location;
   prompt the user to grant access permission to the member of the group of users for the file at the destination location;
   execute the move operation to move the file from the source location to the destination location;
   generate a move notification that includes information about the executed move operation and an update to a link for a location of the file; and
   transmit the move notification to the member of the group of users.

2. The computing device of claim 1, wherein the move notification includes a description of the file, the source location, the destination location, and an initiator of the move operation.

3. The computing device of claim 1, wherein one or more processors are configured to prompt the user to grant access permission to the member of the group of users for the file at the destination location via an authorization notification.

4. The computing device of claim 3, wherein the one or more processors are further configured to:
   transmit the authorization notification to the user, wherein the user is a file owner;
   receive an authorization reply to the authorization notification from the file owner; and
   grant the member of the group of users the access permission to the destination location.

5. The computing device of claim 1, wherein the one or more processors are further configured to:
   automatically grant the member of the group of users the access permission to the destination location.

6. The computing device of claim 1, wherein the one or more processors are configured to generate a move notification that includes information about the executed move operation and an update to a link for a location of the file by
   identifying a source link to the file provided to the member of the group of users, wherein the source link refers to the file at the source location;
   generating a destination link to the file, wherein the destination link refers to the file at the destination location; and
   providing the destination link within the move notification to the member of the group of users.

7. The computing device of claim 1, wherein the one or more processors are further configured to:
   detect a deletion operation to move the file to a deletion container;
   execute the deletion operation; and
   transmit a deletion notification to the member of the group of users to inform the member of the group of users of the deletion operation.

8. The computing device of claim 7, wherein the deletion notification includes a description of the file, the destination location, the deletion container, and an initiator of the deletion operation.

9. The computing device of claim 7, wherein the one or more processors are further configured to execute the deletion operation with one or more processes to:
- detect when the member of the group of users initiated the deletion operation; and
- generate an authorization notification to have a file owner authorize the deletion operation.

10. The computing device of claim 9, wherein the one or more processors are further configured to
- transmit the authorization notification to the file owner;
- receive an authorization reply to the authorization notification, wherein the authorization reply authorizes the deletion operation; and
- execute the deletion operation.

11. A method executed on a computing device to provide a notification based on a destination of a file operation, the method comprising:
- detecting a move operation by a file owner to move a file from a source location to a destination location;
- identifying a stakeholder with an access permission to the destination location;
- identifying a collaborator with an access permission to the source location;
- prompting the file owner to grant access permission to the collaborator for the file at the destination location;
- executing the move operation to move the file from the source location to the destination location;
- generating a move notification that includes information about the executed move operation and an update to a link for a location of the file; and
- transmitting the move notification to the stakeholder and the collaborator.

12. The method of claim 11, further comprising:
- in response to a failure to detect an access operation executed on the file in the destination location within a time period,
  - retransmitting the move notification to the stakeholder and the collaborator.

13. The method of claim 11, wherein transmitting the move notification to the collaborator further comprises:
- identifying the collaborator as a member of a group associated with the stakeholder, wherein the group has the access permission to the destination location.

14. The method of claim 11, wherein prompting the user to grant access permission to the collaborator for the file at the destination location includes
- creating a list of one or more access candidates, wherein the list includes the collaborator; and
- transmitting the list to the file owner to prompt the file owner to provide the access permission to the file at the destination location to a selection from the list.

15. The method of claim 14, wherein transmitting the move notification to the collaborator further comprises:
- receiving the selection from the list whom the file owner has provided the access permission to the file at the destination location, wherein the selection includes the collaborator; and
- granting the access permission to the selection from the list.

16. The method of claim 11, wherein the move notification is transmitted within one or more of an email, a text based message, an audio message, a visual message, and a prompt within a client interlace accessed by one or more of the collaborator and the stakeholder.

17. A computer-readable memory device with instructions stored thereon to provide a notification based on a destination of a file operation, the instructions comprising:
- detecting a move operation by a file owner to move a file from a source location to a destination location;
- identifying a stakeholder with an access permission to the file at the destination location;
- identifying a collaborator with an access permission to the file at the source permission;
- prompting the file owner to grant access permission to the collaborator for the file at the destination location;
- executing the move operation to move the file from the source location to the destination location;
- generating a move notification that includes information about the executed move operation and an update to a link for a location of the file; and
- transmitting the move notification to the stakeholder and the collaborator to inform the stakeholder and the collaborator of the move operation.

18. The computer-readable memory device of claim 17, wherein the instructions further comprise:
- detecting a deletion operation to move the file to a deletion container;
- executing the deletion operation; and
- transmitting a deletion notification to the stakeholder and the collaborator to inform the stakeholder and the collaborator of the deletion operation, wherein the deletion notification includes a description of the destination location, the deletion container, and an initiator of the deletion operation.

19. The computer-readable memory device of claim 17, wherein prompting the file owner to grant access permission to the collaborator for the file at the destination location including
- creating a list of one or more access candidates, wherein the list includes the collaborator;
- transmitting the list to a file owner to prompt the file owner to provide the access permission to the file at the destination location to a selection from the list
- receiving the selection from the list whom the file owner has provided the access permission to the file at the destination location, wherein the selection includes the collaborator; and
- granting the access permission to the selection from the list.

* * * * *